United States Patent [19]
Southworth

[11] Patent Number: 5,675,943
[45] Date of Patent: Oct. 14, 1997

[54] LATERAL LOAD-RESISTING STRUCTURE HAVING SELF-RIGHTING FEATURE

[76] Inventor: George L. Southworth, P.O. Box 16966, Tampa, Fla. 33687

[21] Appl. No.: 557,801

[22] Filed: Nov. 20, 1995

[51] Int. Cl.⁶ .................................................. E04B 1/98
[52] U.S. Cl. .................. 52/167.1; 52/223.9; 52/223.14; 52/231; 52/252; 52/1
[58] Field of Search ............................. 52/1, 167.1, 252, 52/231, 223.9, 223.8, 223.14

[56] References Cited

U.S. PATENT DOCUMENTS

| | | | |
|---|---|---|---|
| 1,848,246 | 3/1932 | Dowell | 52/252 |
| 3,226,894 | 1/1966 | Burchardt et al. | 52/252 |
| 4,059,931 | 11/1977 | Mongan | 52/223.9 X |
| 4,630,412 | 12/1986 | Engstrom et al. | 52/167.1 X |
| 5,253,460 | 10/1993 | Simenoff | 52/252 |
| 5,305,573 | 4/1994 | Baumann | 52/223.8 X |

*Primary Examiner*—Christopher T. Kent
*Attorney, Agent, or Firm*—Ronald E. Smith

[57] ABSTRACT

The constructability of a concrete structure is facilitated by providing pre-assembled, modular frame units formed of steel or concrete beams and columns. Reinforcing bars have their opposite ends embedded in the beams that form each frame unit, but in most embodiments they are unattached to the columns because they extend through tubular debonding sleeves embedded within the columns. An elongate post-tensioning duct extends through each frame unit and an elongate tendon having opposite ends that may be placed under tension extends through the duct so that it compresses the frame unit. When a lateral load impacts against the frame unit, the reinforcing members that extend through the tubular sleeves stretch within the sleeves but their resilience urges the vertical columns to regain their vertical disposition when the impact passes. The elongate tendon that extends through the post-tensioning duct similarly urges the frame unit to regain its position of repose. Concrete edges of the beams are protected from spauling during tilting of the vertical columns by confinement members. Several optional elements further enhance the lateral force resistance of the frame unit. The redundancy of a structure built in accordance with the method enables it to survive minor lateral load events with nominal damage and to at least maintain its structural integrity after major lateral load events.

15 Claims, 5 Drawing Sheets

LATERAL LOAD-RESISTING STRUCTURE HAVING SELF-RIGHTING FEATURE

BACKGROUND OF THE INVENTION

1. Field of the Invention

This invention relates, generally, to lateral load-resistant structures. Specifically, it relates to improvements in construction engineering that increase the survivability of structures such as buildings and bridges when subjected to lateral loads of the type generated by earthquakes, bomb blasts, high winds, and the like.

2. Description of the Prior Art

It is well known that building frames in earthquake-prone areas should not be constructed of heavy beams and vertical columns with little lateral load resistance. Accordingly, many improvements in the art of building construction relate to means for strengthening vertical columns against the effects of lateral loads, and most building codes in earthquake-prone areas require strong columns and weak beams.

A 1916 patent to Maguire and others (U.S. Pat. No. 1,205,465) discloses a building construction intended to be built by the same methods used when erecting a steel frame structure, but having pre-formed concrete columns, girders, beams, and the like instead of steel parts. The individual concrete parts are reinforced with metallic reinforcement bars, commonly known as rebars. A structure made in accordance with the teachings and suggestions of this patent would benefit from the durability of concrete, and the use of pre-formed parts would reduce the costs normally associated with building a concrete structure.

A plurality of concrete parts are stacked atop one another and interlocked with nut and bolts to form a column in the structure disclosed in U.S. Pat. No. 2,115,949 to Gurber. The walls, however, are thick at the base and become narrower with increasing elevation.

Multiple concrete rebars are arranged in a circular pattern and the columns they reinforce are slideably mounted for horizontal movement in Japanese patent No. 1-102124 (1989).

Many other patents and technical papers have disclosed other construction techniques for increasing the strength of concrete structures such as buildings and bridges. However, a common thread runs through all of the prior art designs: every feature is intended to inhibit building frame deformation resulting from the forces of an earthquake or other lateral loads, but if the frame is partially damaged by such forces, inadequate recovery means are provided. Moreover, if the frame is severely damaged, inadequate means are provided to resist further frame deformation during the time escape or rescue attempts may be made.

Still another major drawback of earlier designs is that they require special skill and extra effort to construct, i.e., they lack good constructability. For example, in a prior art building equipped with post tensioning tendons that extend through each floor of the building, the individual horizontal beams that form each floor must be temporarily propped up while an elongate tendon is run through them; this is a difficult, time-consuming procedure that requires the expenditure of extra time, money, and skill to perform.

Another characteristic of earlier designs is that they require close conformity to tight tolerance specifications. Since the earlier designs treat the building or other structure as a whole, it is inevitable that the spacings between parts thereof must fit precisely with little variation from specified tolerances.

Aftershocks are common after major earthquakes; thus, if the structural defenses of a conventional structure are defeated or significantly weakened by an initial force, the structure is virtually defenseless against further quakes or winds. Rescue efforts are often halted in damaged buildings, for example, for fear of aftershocks or high winds that might cause further deterioration of the structural integrity of the structure while rescue workers are inside. After the Oklahoma City bombing, for example, a threat to rescue workers arising from high winds required suspension of rescue efforts.

A frame construction is needed that would at least hold a damaged building frame together during high winds, earthquake aftershocks, or other lateral load events so that survivors of a major lateral load event would be able to escape and so that rescue attempts would not require curtailment.

There is also a need for a frame construction that recovers completely or nearly completely after the occurrence of a mild to moderate lateral load event. Such a frame design would be advantageous because it would limit damage to hairline fractures, broken drywall, and the like. However, in view of the large body of prior art, taken as a whole, at the time the present invention was made, it was not obvious to those of ordinary skill in the art of structural engineering how these desirable objectives could be attained.

SUMMARY OF THE INVENTION

The present invention pioneers the art of easily constructable building frames that recover fully or almost completely after being subjected to mild to moderate lateral forces, and which at least hold a building together, i.e., maintain its structural integrity, during and after major lateral load events.

Perhaps the most important teaching of this invention is the discovery that a structure constructed of a plurality of interconnected modular frame units, each of which is individually designed to withstand lateral load events or at least to maintain their individual structural integrities after such events, is better able to withstand lateral loads than a structure that is rigidly braced and otherwise designed to withstand lateral load events as a whole. When multiple individual frame units are collectively employed in interconnected relation to one another to form a whole, as taught herein, the structure has an articulated frame, so to speak, that can bend or sway with lateral loads by differing amounts as between different floors, whereas a rigid structure lacks such flexibility and must bend or break as a whole. Just as importantly, the rigid structures of the prior art may or may not recover from minor lateral load events, depending upon the magnitude of the lateral load and the rigidity of the structure, but few rigid structures maintain their structural integrity after a major lateral load event. If a highrise building is made so rigid that it can withstand major lateral loads without loss of structural integrity, the occupants of the upper floors thereof would be subjected to life-threatening projectiles as the energy of the lateral load would be transmitted substantially without attenuation to such upper floors, thereby hurling furniture, filing cabinets, and other heavy items at such occupants. Bolting down or otherwise securing all such heavy items would not completely solve the problem because such occupants themselves would be hurled against the structure like the occupants of a tank struck with a shell.

This invention provides a technological breakthrough because it facilitates the constructability of and provides a structure having an articulated frame made of a plurality of frame units which restores itself to a position of repose after minor lateral loads, and that at least maintains its structural integrity after major lateral loads, without injecting unacceptable levels of rigidity into the structure. Significantly, the construction requires no special construction techniques and does not include, for example, temporary propping of beams to enable the placement therethrough of elongate tendons. Moreover, the construction is not hampered by a need to adhere to tight tolerances. Accordingly, structures built in accordance with the techniques disclosed hereinafter are easily built and are thus said to have a high degree of constructability.

The innovative design includes pre-formed modular frame units that are uniquely reinforced. The pre-formed frame units may be of concrete, steel, or other suitable material. Ideally, the frame units are manufactured under controlled conditions at a factory so that the overall frame of a structure may be constructed merely by interconnecting the novel frame units to one another at a construction site. Advantageously, the interconnection of the novel frame units is performed by any suitable conventional means so the construction industry need not learn new techniques in employing the inventive modular frame units. The frame units may be stacked for multi-story construction and generally arranged in any array so that the use of such frame units does not inhibit architectural design. The frame units may take virtually any shape and they may be interconnected to one another directly. They may also be separated from one another by interconnecting means such as conventional beams or columns.

Frame units can be used with virtually any floor system capable of developing a diaphragm, such as steel, concrete, wood, and the like. Construction that includes no floor system is also within the scope of this invention.

The frame units are preferably manufactured under controlled conditions in a factory and are delivered to a job site, but in bridge construction, where the size and weight of the novel frame units might preclude economical transportation thereof, the frames can be built at the site.

The novel design lends itself to modular construction techniques, i.e., it is not limited to construction of a certain type of building or bridge. Moreover, the novel frame units are provided in a multitude of differing configurations, and many of such configurations might be employed within a single structure.

More particularly, a bridge or building frame unit built in accordance with the teachings and suggestions of this invention might include, in one embodiment, a pair of laterally spaced apart vertical columns having a horizontal beam disposed between them and having a predetermined length of a horizontal beam abutting each of said vertical columns on their respective outer sides. Other modular frame designs might include a pair of laterally spaced apart vertical columns having a horizontal beam extending between their respective lowermost ends or their respective uppermost ends, or both. Numerous other frame designs are within the scope of this invention.

The novel frame designs are modular in construction so that a multiplicity of them may be stacked, disposed side-by-side, or spaced from one another by suitable interconnection means in any pattern without restriction so that they may be used in any building or bridge design.

In the simplest form of the novel frame, a column is flanked by a pair of horizontal beams and a single horizontally disposed debonding sleeve is embedded within the vertical column. An elongate reinforcing member having its opposite ends embedded in the concrete that forms the horizontal beams extends through the debonding sleeve but is not attached to said debonding sleeve. Thus, minor tilting from the vertical by the column is resisted by the reinforcing member and said reinforcing member stretches momentarily as the column tilts but returns to its position of repose, thereby righting the column, after the lateral load has passed. Where the lateral load is severe, the reinforcing member may be stretched beyond its elastic limit but it will still contract to a substantial extent after the lateral load has passed, and will continue to ensure the structural integrity of the structure.

The debonding sleeve is not necessarily positioned solely within a vertical column, i.e., it may also be positioned partially in a column and partially in a beam; it merely needs to span or abut a beam/column joint so that stretching may occur when a column is tilted from the vertical.

In a more typical frame design, at least one horizontally disposed debonding sleeve is embedded within each of two vertically disposed, laterally spaced apart concrete columns, and a reinforcing member extends therethrough in unbonded relation thereto. The length of the sleeve may be equal to the width of the column, or may be less or greater than said width; the preferred length is selected so as to allow the reinforcing member to stretch without breaking when the vertical columns are tilted from the vertical by a lateral load event.

In a preferred embodiment of the invention, a first plurality of parallel debonding sleeves extend through a first vertical column in vertically spaced relation to a second plurality of parallel debonding sleeves extending through the same column, and the same arrangement of parts is employed in a second vertical column disposed in laterally spaced relation to the first. The first and second plurality of debonding sleeves of each column are aligned with a corresponding first and second plurality of reinforcing members, which may be of metallic construction, reinforced carbon fiber construction, or other suitable material, that are embedded within their associated horizontal members near their respective top and bottom edges. Thus, each reinforcing member of the first plurality of reinforcing members extends through its associated debonding sleeve of said first plurality of debonding sleeves and each reinforcing member of said second plurality of reinforcing members extends through its associated debonding sleeve of said second plurality of debonding sleeves.

Therefore, when said vertical columns are offset from a vertical plane by the application of externally imparted lateral forces impinging thereagainst, the vertical columns tilt from said vertical plane and the reinforcing members extending through their associated debonding sleeves stretch. If the stretching does not extend beyond the elastic limits of the reinforcing members, they will tend to resume their respective original lengths after the externally imparted force has passed. Even if the respective elastic limits of the reinforcing members are exceeded, they will tend to resume their original length but will have some, perhaps nominal, amount of residual strain so that they do not quite return to their respective original lengths. Thus, when the vertical columns lean from a vertical plane in response to a lateral load, the reinforcing members passing through the respective debonding sleeves extending therethrough will tend to right the columns as said reinforcing members return or nearly return to their respective original lengths as a function of their inherent resilience.

A second embodiment includes the debonding sleeves and reinforcing members of the first embodiment, and adds a post tensioning duct and tendon assembly that extends through a frame unit to compress it. More particularly, means are provided at opposite ends of the post tensioning duct for tensioning the tendon received therewithin; thus, the tendon applies compressive forces to the respective horizontal beams and vertical columns through which it passes, thereby providing increased resistance to tilting of the vertical columns and thereby helping said vertical columns return to a vertical plane after a shock has passed. Such compression resists vertical tilting of the columns and serves to return the columns to their vertical positions even after a major lateral load. The compression also tends to help the reinforcing members return to or nearly to their original lengths, even after they have been stretched beyond their elastic limit.

During a lateral load event, a tall building built in accordance with the novel techniques of this invention will sway from side to side or back and forth like a conventional building, but with the important difference that each floor of such building may sway by differing amounts than its adjacent floors, due to the modular construction techniques of this invention. On any given floor, the joints between the beams and columns will open and close during the load event. More particularly, the post tensioning means works when the joint is open to pull the joint closed again. As the event continues, the joint will open again and the post tensioning means will close it again and so on during the event, i.e., until the event has ended, the system will cycle, at a frequency determined by the frequency of the vibration caused by the lateral load event, and by the physical characteristics of the building.

A third embodiment of the invention incorporates the teachings of the first two embodiments and adds protective means for protecting the corners of the concrete horizontal members against the effects of a vertical column tilting thereagainst. More particularly, an angle-shaped device called a confinement angle, made of steel or other suitable material, is positioned in overlying relation to each end of a horizontal beam where said beam abuts a vertical column. Thus, a pair of upper confinement angles is disposed along opposite top edges of a horizontal beam if both ends thereof abut a vertical column, and a second pair of confinement angles is disposed along both bottom edges of said horizontal beam. Alternatively, the confinement angles could be positioned on the columns instead.

A fourth embodiment includes a post-tensioning duct and associated tendon in each vertical column to compress said column in the same manner as the first-mentioned compression is applied to the horizontal beams, a fifth embodiment adds a tubular steel shear connector that receives the post-tensioning duct where said duct passes through a vertical column and which further supports the beams when the interface between the columns and beams has been opened, and a sixth embodiment adds a steel compression strut/joint assembly of rebars that are embedded within the vertical columns in the plane of the horizontal members to transfer compressive forces across their associated columns.

Concerning the fifth embodiment, it should be understood that the connector need not be formed of steel, i.e., many different materials, including concrete, could be used; all that is required is a bore through the column. Moreover, in an alternative embodiment, the connector need not receive a post-tensioning duct and tendon.

It should thus be clear that the primary object of this invention is to revolutionize the art of building and bridge construction by disclosing for the first time, anywhere in the world, modular frame units that tie together columns and beams in a unique way so that such modular frame units are highly resistant to permanent damage from low to moderate lateral load events and so that said units will at least maintain the structural integrity of a structure built by linking together such units even after the structure has been subjected to a major lateral load event.

Another major object of this invention is to improve the constructability of lateral load-resistant structures.

A more specific object is to disclose debonding sleeves that enable reinforcing members to stretch at critical locations during a lateral load event and to recover completely or nearly completely from such stretching when the event passes.

Another more specific object is to disclose a post tensioning duct and associated tendon that extend through a modular frame unit to compress it, thereby resisting its deformation during a low to moderate lateral load event and urging it to resume or nearly resume its position of repose after the event has passed, and at least maintaining the structural integrity of a structure during a major lateral load event and subsequent lateral load events to enhance escape and rescue probabilities.

These and other important objects, features, and advantages of the invention will become apparent as this description proceeds.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, within which.

DETAILED DESCRIPTION OF THE PREFERRED EMBODIMENT

Figure 1:
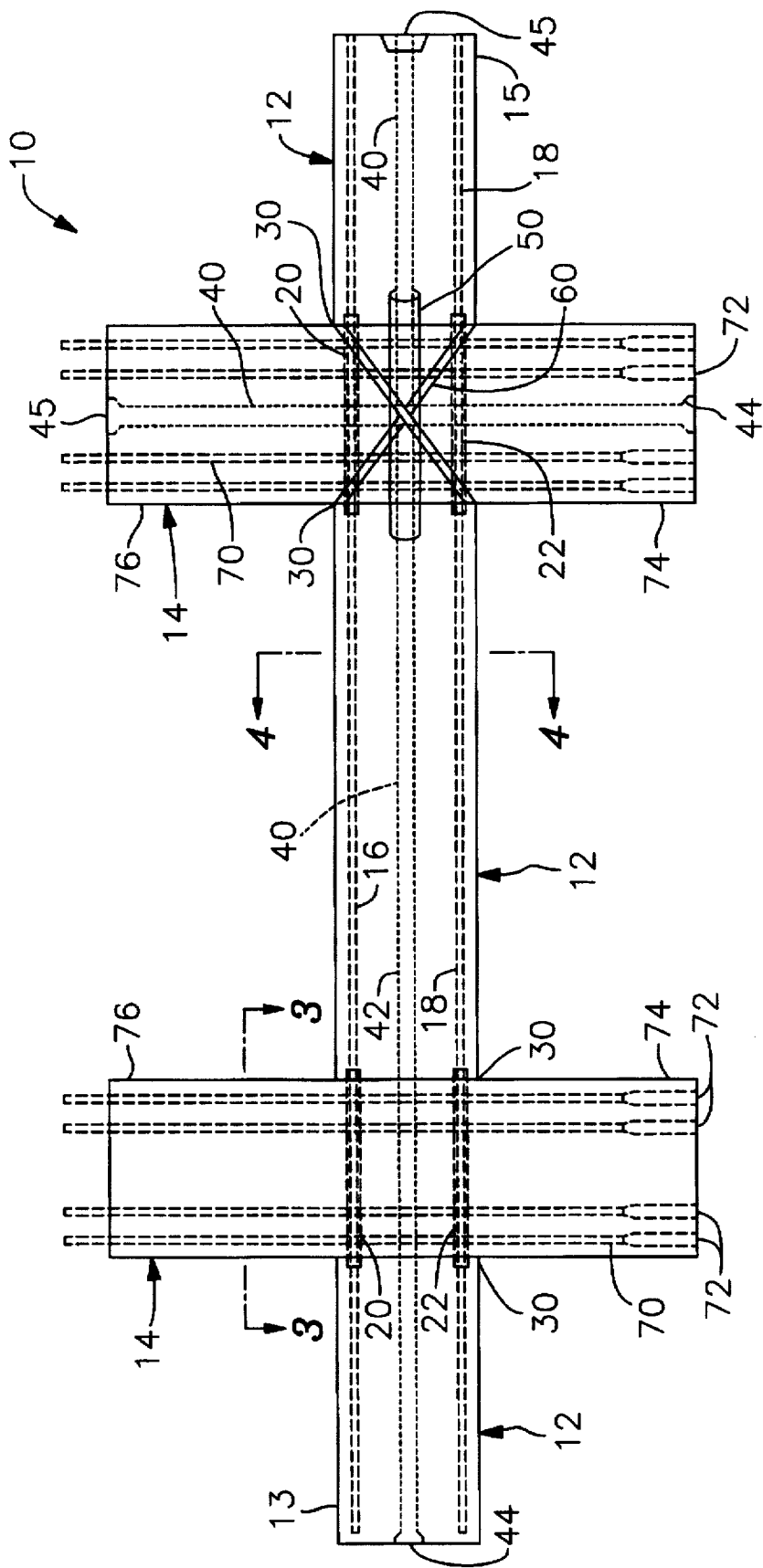
FIG. 1 is a side elevational view of a first embodiment of a novel frame structure in repose.
Figure 2:
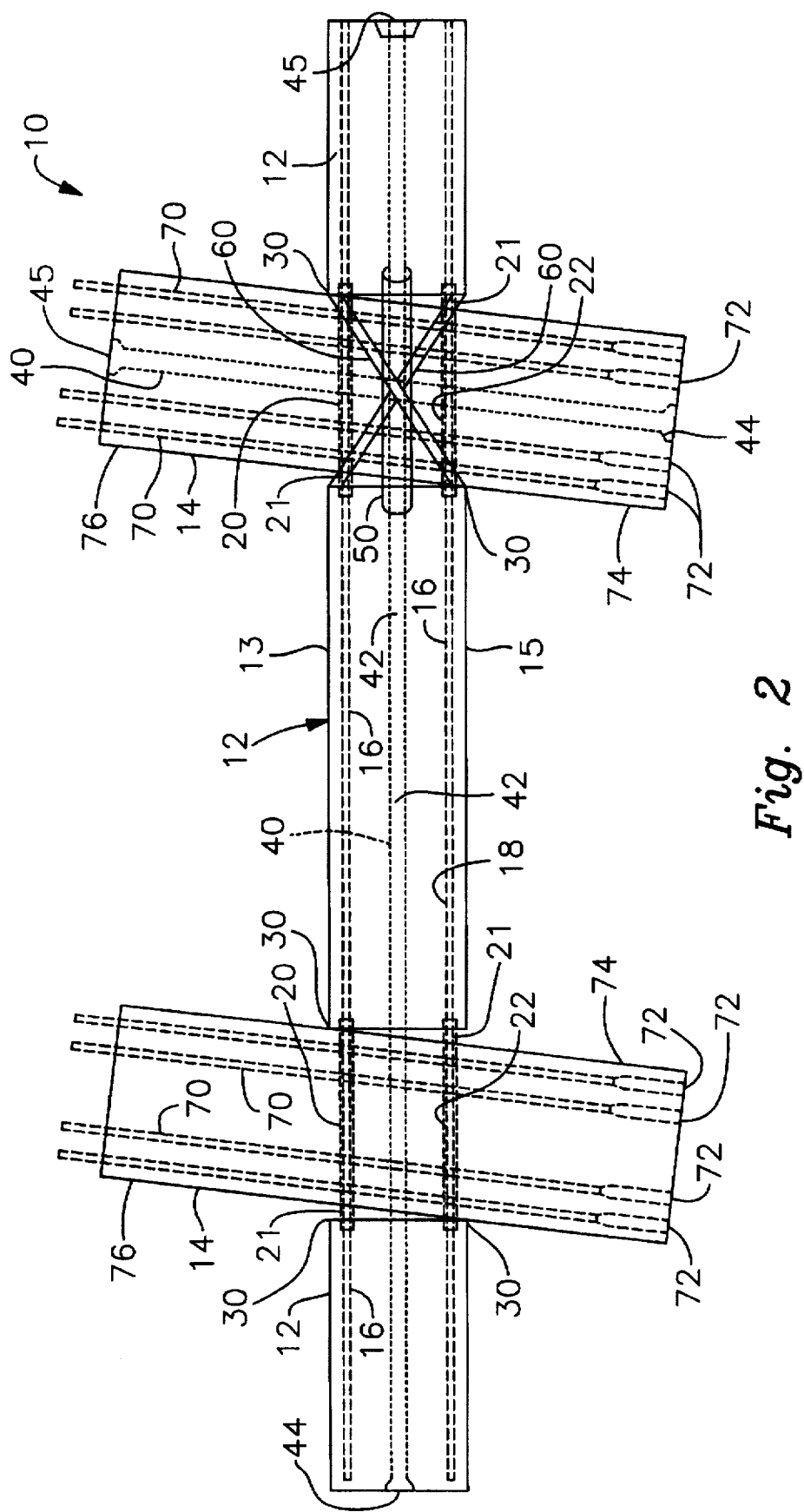
FIG. 2 is a side elevational view of the FIG. 1 frame when strong lateral forces are imparted thereto.

FIG. 1 depicts a modular frame unit of this invention when in repose, and FIG. 2 depicts the same frame unit when it is being subjected to a strong lateral load. An important object of this invention, as set forth earlier, is to help a frame unit resume its FIG. 1 position after having been driven into said FIG. 2 position. Since a building or bridge is generally built with a plurality of the novel frame units (although a construction including a single frame unit is possible), the resilience of the individual frame units leads to the resilience of the overall building or bridge.

Exemplary frame unit 10 includes a plurality of horizontal beams, collectively denoted 12, and vertical columns, collectively denoted 14. A first plurality of parallel, horizontally disposed reinforcing members, collectively denoted 16, are embedded in beams 12 near their respective top surfaces 13 as depicted. The reinforcing members may be conventional metallic rebars or any acceptable substitute therefor, such as carbon fiber reinforcing members. For convenience purposes only, the reinforcing members will be referred to as rebars. A second plurality of parallel, horizontally disposed rebars, collectively denoted 18, are embedded in beams 12 near their respective bottom surfaces 15.

Figure 5:
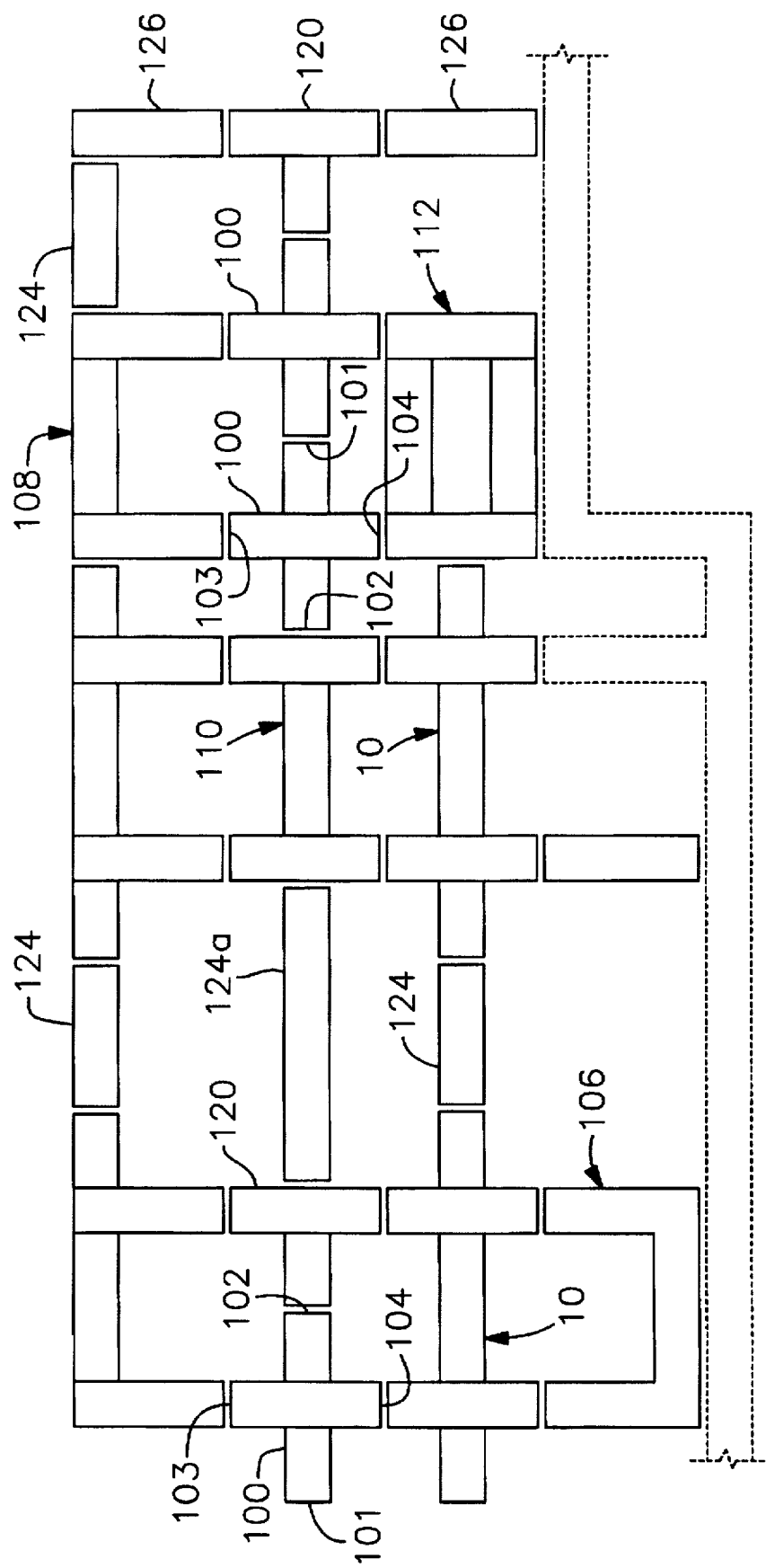
FIG. 5 is an elevational view depicting the frame of a structure including some of the modular frame units of this invention.

Rebars 16, 18 are not attached or otherwise secured to vertical columns 14 if said rebars extend through said columns; they are attached if they extend into, but not through, such columns (see the "L," "H," and "T"-shaped assemblies in FIG. 5 such as assemblies 108, 110, 112, 120, and the like). A plurality of horizontally disposed, parallel upper and lower debonding sleeves of tubular construction, denoted 20 and 22, respectively, are embedded within each column 14 and slideably receive rebars 16, 18. Accordingly, as best understood in connection with FIG. 2, said rebars may stretch inside their respective debonding sleeves 20, 22 when columns 14 are tilted from a vertical plane during application of lateral forces to the frame unit formed by beams 12 and columns 14. Said rebars also stretch as at 21; it should be understood that they stretch along their entire debonded length, excepting their embedded-in-concrete opposite ends.

Reference numeral 30 collectively denotes a plurality of confinement members which are preferably of steel or other suitable metallic material and which may have a transverse cross-sectional configuration of right angle configuration; they may also be provided in the form of flat plates as well. Each confinement member overlies an end edge or corner of a beam 12 where said end edge abuts a column 14, and prevents spauling of the concrete corners of said beams when the structure is in a position like that of FIG. 2. The confinement members may be mounted on the column corners instead of the beam corners if a beam is positioned at the top or bottom of a column.

An elongate post-tensioning duct 40 may be embedded within each of the horizontal members 12 or within each of the vertical columns 14, or both. As depicted, duct 40 is continuous in construction and its opposite ends are positioned at opposite ends of frame unit 10.

An elongate reinforcing member in the form of a tensioned strand, a tendon, or other suitable compression means 42 is positioned within said duct 40, and is unbonded or, as in a long frame application, partially bonded thereto; its opposite ends are anchored as at 44, 45. Upon tensioning of said tendon 42 by suitable, conventional means, the beams and columns along the extent thereof are compressed. This extra compression helps the frame unit remain in its FIG. 1 position during the application thereto of moderate lateral loads. Even more importantly, such compression urges the frame unit to return or nearly return to its FIG. 1 position of repose after experiencing a lateral load sufficient to cause momentary displacement into a nonequilibrium position such as depicted FIG. 2. Where the lateral load is so intense that the frame unit cannot return to or near its FIG. 1 position, tendon 42 at least maintains the structural integrity of the building for escape and rescue purposes, i.e., it prevents the horizontal beams from separating from the columns and pancaking atop one another.

Note from the column depicted in the right-hand side of FIGS. 1 and 2 that a post-tensioning duct 40 and rebar 42 may also be provided to provide compression to each vertical column 14 if desired.

Moreover, a shear connector 50 of suitable material such as steel, concrete, etc., may, but not necessarily, ensleeve post-tension duct 40 where it passes through each vertical column so that the tendon may stretch in the region of the column in the same way as rebars 16. The steel shear connector may also extend beyond both sides of the column as depicted to further prevent falling of the horizontal beams during severe deformation of the individual frame unit.

In another optional embodiment, a compression strut/joint assembly 60 of suitable material may be provided within each column as shown to reinforce each column at the location where the stresses are greatest when the columns tilt from their vertical positions of repose, i.e., in a plane coincident with the plane of the abutting horizontal beams. Each assembly 60 is a collection of rebars or other shapes of suitable material that may be arranged in an "X" pattern as depicted at the right hand side of the Figures, or in other patterns that may be designed by a structural engineer.

Stacking of the novel frame units is facilitated by the arrangement of rebars 70 within vertical columns 14. Each column 14 has a relatively truncate construction so that a multistory structure would require a plurality of said columns stacked atop one another. Such stacking is facilitated by sockets 72 formed in the bottom end 74 of each column and by selecting the lengths of rebars 70 so that their respective distal ends extend externally from the top end 76 of said columns. The depth of each socket 72 is substantially equal to the external extent of each rebar 70 so that said sockets 72 slidingly receive said rebars when columns 14 are stacked atop one another. There are numerous other ways of interconnecting stacked frame units that will become apparent to those skilled in the construction arts, now that the invention has been disclosed, and any suitable stacking/interconnecting means is within the scope of this invention.

Figure 3:
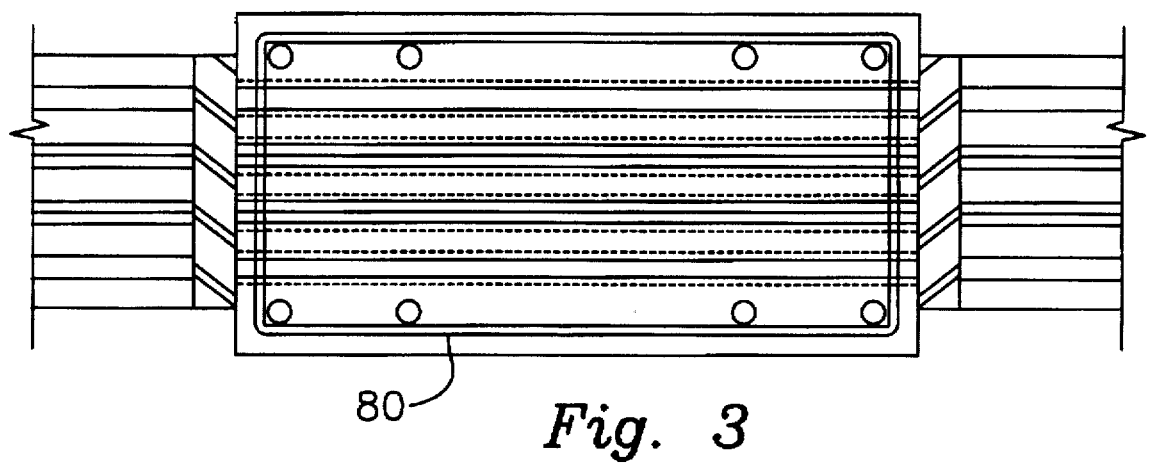
FIG. 3 is a sectional view taken along line 3—3 in FIG. 1.
Figure 4:
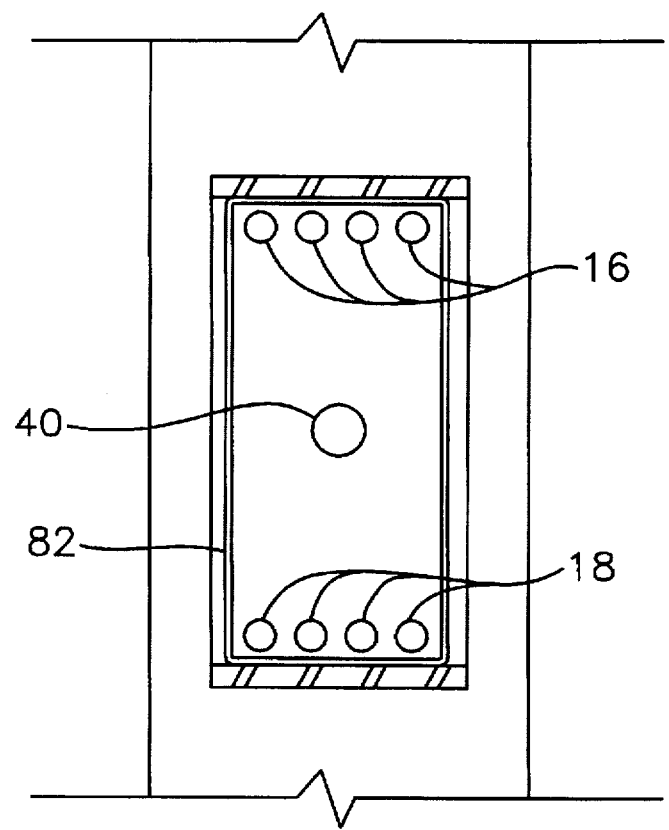
FIG. 4 is a sectional view taken along line 4—4 in FIG. 1.

FIGS. 3 and 4 provide additional details of construction. All of the parts disclosed therein have been identified above, except for column stirrup 80 (FIG. 3) and beam stirrup 82 (FIG. 4) which are well known in the art of concrete construction. The stirrups supplement the shear capacity of the concrete bearings, i.e., they inhibit their shearing and falling.

FIG. 5 depicts the frame of an exemplary building built in accordance with the teachings and suggestions of this disclosure. Note that there are a variety of frame units employed in this example. More particularly, the three frame units collectively denoted 100 are the simplest frame units in that they include only one column. It should be understood that the horizontal post tensioning duct 40 and tendon 42 used with frame unit 100 extends between the points denoted 101, 102, and that a vertical post tensioning duct and tendon could also be employed; such vertical duct and tendon would extend between points 103, 104. The enormous strength and the ability of frame unit 100 to return to its position of repose, or to at least avoid falling apart, should be apparent.

Frame units of the type depicted in FIGS. 1–4 are collectively denoted 10 in FIG. 5. Each of them is equipped with a post tensioning duct 40 and tendon 42 therewithin as described above. Duct 40 may be positioned concentrically within its associated beams or column, or eccentrically, and there may be more than one duct and tendon within a beam or column.

It is critical to observe that a structure built with the novel frame units will have a plurality of horizontally disposed tendons on each floor of the structure, instead of one elongate tendon that extends from one side of the building to the other, or from the front of a building to its back. Such building-length tendons have been tried heretofore; they are inadequate because their extreme length allows them to stretch long distances and such stretching does not serve to adequately maintain the structural integrity of the building. Accordingly, the art has attempted to improve their utility by bonding them to the post tensioning duct within which they are received at preselected longitudinal intervals, but this requires cutting holes in the post-tensioning duct and charging grout though the holes, i.e., such technique adds considerable expense to the construction project. By employing a plurality of relatively truncate tendons across the width and depth of a building or bridge, structural integrity is better maintained, i.e., greater redundancy is built into the structure.

Other exemplary shapes of the novel frame units include a "U"-shaped frame unit denoted 106 as a whole, an inverted "U"-shaped frame unit denoted 108 as a whole, an "H"-shaped frame unit denoted 110 as a whole, a box-shaped frame unit denoted 112 as a whole, and numerous other geometric configurations, all of which are within the scope of this invention.

Figure 6A:
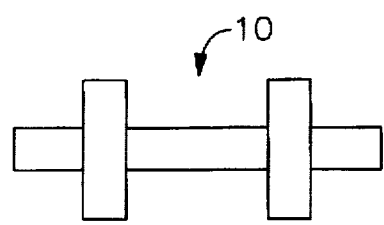
FIG. 6a is a side elevational view of a first exemplary modular frame unit.
Figure 6B:
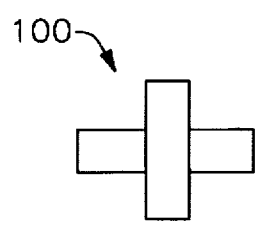
FIG. 6b is a side elevational view of a second exemplary modular frame unit.
Figure 6C:
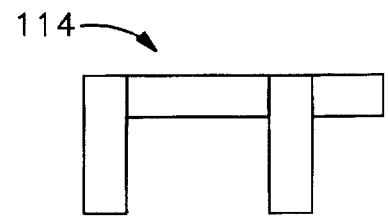
FIG. 6c is a side elevational view of a third exemplary modular frame unit.
Figure 6D:
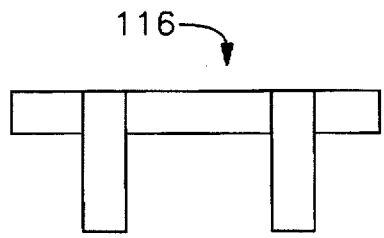
FIG. 6d is a side elevational view of a fourth exemplary modular frame unit.
Figure 6E:
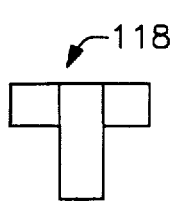
FIG. 6e is a side elevational view of a fifth exemplary modular frame unit.
Figure 6F:
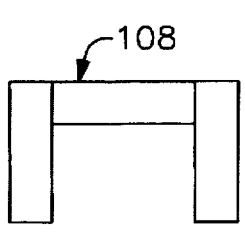
FIG. 6f is a side elevational view of a sixth exemplary modular frame unit.
Figure 6G:
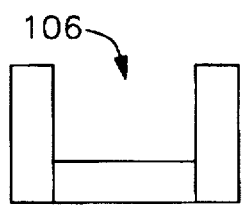
FIG. 6g is a side elevational view of a seventh exemplary modular frame unit.
Figure 6H:
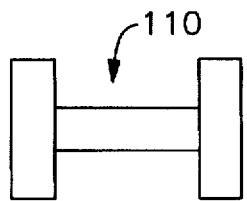
FIG. 6h is a side elevational view of an eighth exemplary modular frame unit.
Figure 6I:
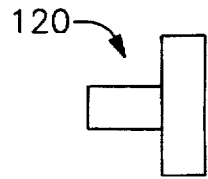
FIG. 6i is a side elevational view of a ninth exemplary modular frame unit.
Figure 6J:
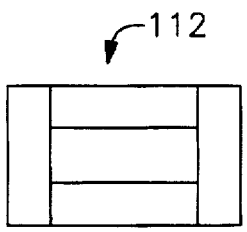
FIG. 6j is a side elevational view of a tenth exemplary modular frame unit.
Figure 6K:
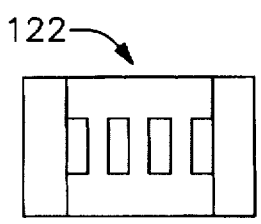
FIG. 6k is a side elevational view of an eleventh exemplary modular frame unit.
Figure 6L:
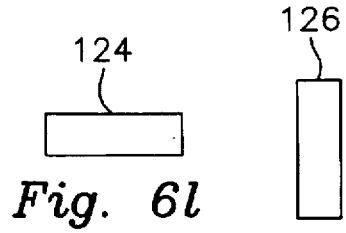
FIG. 6l is a side elevational view of a twelfth exemplary modular frame unit.
Figure 6M:
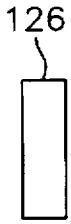
FIG. 6m is a side elevational view of a thirteenth exemplary modular frame unit.

For example, a few additional geometric configurations appear in FIGS. 6a–6m. The configuration of FIG. 6a is the same as the configuration depicted in FIG. 1, and configuration of FIG. 6b is a variation thereof. The frame units denoted 114 (FIG. 6c) and 116 (FIG. 6d) are variations of inverted "U" frame unit 108 (FIG. 6f) and similar variations could be provided for the "U"-shaped frame unit 106 (FIG. 6g). "T"-shaped unit 118 (FIG 6e) and a variation 120 (FIG. 6i) thereof are depicted, as are an "H"-shaped unit 110 (FIG. 6h), a box-shaped unit 112 (FIG. 6j), and units denoted 122 (FIG. 6k), 124 (FIG. 6l), and 126 (FIG. 6m). A typical use of unit 120 (FIG. 6i) is depicted in FIG. 5 at the right end thereof.

It is important to note, as mentioned earlier, that the novel frame units may be separated from one another by beams or columns that serve as interfaces between frame units. In FIG. 5, two horizontal drop-in beams, denoted 124 and 124a, are depicted; neither of them forms a part of a frame unit but serves nonetheless to link frame units together.

Similar vertical columns such as columns 126 may be used to link together frame units that are in stacked relation to one another, or to provide support for a frame unit as indicated in the lower righthand corner of FIG. 5, and so forth.

This invention is clearly new and useful. Moreover, in view of the prior art as a whole at the time the invention was made, it was not obvious to those of ordinary skill in this art.

It will thus be seen that the objects set forth above, and those made apparent by the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A lateral load-resistant structure, comprising: a plurality of modular, pre-assembled frame units that are interconnected to one another at a construction site to collectively form a frame for said lateral load-resistant structure;

each frame unit including at least one pre-formed concrete beam;

each frame unit including at least one pre-formed concrete column disposed in abutting relation to said at least one pre-formed concrete beam;

each frame unit including at least one interface where said at least one pre-formed concrete column abuts said at least one pre-formed concrete beam;

at least one tubular debonding sleeve disposed horizontally in spanning relation to said at least one interface, said at least one tubular debonding sleeve having opposite ends embedded in said at least one pre-formed concrete column and said at least one pre-formed concrete beam;

at least one horizontally disposed reinforcing member extending through said at least one tubular debonding sleeve in unattached relation thereto;

said at least one horizontally disposed reinforcing member having opposite ends embedded within said at least one pre-formed concrete beam and said at least one pre-formed concrete column;

an elongate post-tensioning duct extending horizontally through a frame unit;

an elongate tendon extending through said elongate post-tensioning duct in unattached relation thereto;

anchoring means for engaging opposite ends of said elongate tendon to enable subsequent application of tension to said elongate tendon;

said elongate tendon adapted to apply compression forces to said frame unit;

said compression forces urging said tendon to resume a position of repose after stretching, thereby urging said at least one pre-formed concrete column to regain a vertical position of repose after impact of a lateral force has ended;

whereby each modular frame unit responds to lateral forces substantially independently of other modular frame units within said structure, thereby increasing the redundancy of the structure;

whereby tilting of said at least one pre-formed concrete column in response to a lateral load impacting thereagainst is resisted by said reinforcing member;

whereby said reinforcing member serves to maintain a predetermined amount of structural integrity of said at least one modular frame unit if the elastic limit of said reinforcing member is exceeded; and whereby constructability of said structure is facilitated by the modular frame units.

2. The structure of claim 1, further comprising:

at least one tubular debonding sleeve disposed vertically in spanning relation to said at least one interface, said at least one tubular debonding sleeve having opposite ends embedded in said at least one preformed concrete column and said at least one pre-formed concrete beam;

at least one vertically disposed reinforcing member extending through said at least one tubular debonding sleeve in unattached relation thereto;

said at least one vertically disposed reinforcing member having opposite ends embedded within said at least one pre-formed concrete column and said at least one pre-formed concrete beam;

an elongate post-tensioning duct extending vertically through said frame unit;

an elongate tendon ensleeved within said post-tensioning duct in unattached relation thereto;

anchoring means for engaging opposite ends of said elongate tendon to enable subsequent application of tension to said anchoring means;

said elongate tendon applying compression to said at least one pre-formed concrete column;

whereby tilting of said at least one pre-formed concrete column in response to a lateral load impacting thereagainst is resisted by said reinforcing member and said elongate tendon;

whereby said reinforcing member and said elongate tendon collectively urge said at least one pre-formed concrete column to regain a vertical disposition after said lateral load has ended if an elastic limit of said reinforcing member is not exceeded;

whereby said elongate tendon urges said at least one pre-formed concrete column to regain a vertical disposition after said lateral load has ended and said reinforcing member serves to maintain a predetermined amount of structural integrity of said at least one modular frame unit if the elastic limit of said reinforcing member is exceeded; and whereby constructability of said structure is facilitated by the modular frame units.

3. The structure of claim 1, further comprising:

a confinement means positioned on each edge of said at least one concrete beam, each confinement means preventing spauling of concrete of which said at least one concrete beam is formed.

4. The structure of claim 2, further comprising:

a confinement means positioned on each edge of said at least one concrete column, each confinement means preventing spauling of concrete of which said at least one concrete column is formed.

5. The structure of claim 2, further comprising:

a shear connector embedded within said at least one pre-formed concrete column.

6. The structure of claim 5, wherein said post-tensioning duct extends through said shear connector in ensleeved and unattached relation thereto.

7. The structure of claim 2, further comprising:

a compression assembly embedded within said at least one pre-formed concrete column;

said compression assembly formed by a plurality of shapes arranged in a predetermined pattern;

said compression assembly strengthening said at least one pre-formed concrete column;

said compression assembly being positioned within said at least one pre-formed concrete column in a plane coincident with a plane defined by said at least one pre-formed concrete beam.

8. The structure of claim 1, wherein said at least one pre-formed concrete column is a modular column of truncate extent and wherein a plurality of such modular columns are disposed in vertically stacked relation to one another to collectively form an elongate vertical column.

9. The structure of claim 8, further comprising:

at least one reinforcing bar-receiving socket formed in a bottom end of said modular column;

at least one reinforcing bar embedded within said modular column;

said at least one reinforcing bar having a proximal end disposed adjacent said at least one reinforcing bar-receiving socket and having a predetermined length so that a distal end thereof extends out of a top end of said modular column;

said distal end having a length sufficient to engage a socket formed in a contiguous modular column so that a plurality of modular columns may be stacked in vertical relation to one another to form a larger column.

10. The structure of claim 8, further comprising a post-tensioning duct formed in said modular column, and an elongate reinforcing bar slideably disposed in said post-tensioning duct, said elongate reinforcing bar being under tension to compress said modular column.

11. A lateral load-resistant structure, comprising:

a plurality of modular, pre-assembled frame units that are interconnected to one another at a construction site to collectively form a frame for said lateral load-resistant structure;

at least one frame unit having a "T" shape and including at least one pre-formed concrete beam and at least one pre-formed concrete column disposed in abutting relation to one another;

at least one vertically disposed tubular debonding sleeve having a first end disposed at least partially within said at least one pre-formed concrete column and having a second end disposed at least partially within said at least one pre-formed concrete beam;

at least one vertically disposed reinforcing member extending through said at least one tubular debonding sleeve in unattached relation thereto;

said at least one vertically disposed reinforcing member having opposite ends embedded within said at least one pre-formed concrete column and said at least one preformed concrete beam;

whereby tilting of said at least one pre-formed concrete column in response to a lateral load impacting thereagainst is resisted by said reinforcing member;

whereby said reinforcing member urges said at least one pre-formed concrete column to regain a vertical disposition after said lateral load has ended if an elastic limit of said reinforcing member has not been exceeded;

whereby said reinforcing member maintains a predetermined amount structural integrity of said modular frame unit if the elastic limit of said reinforcing member is exceeded; and whereby constructability of said structure is facilitated by said plurality of modular frame units.

12. A lateral load-resistant structure, comprising:

a plurality of modular, pre-assembled frame units that are interconnected to one another at a construction site to collectively form a frame for said lateral load-resistant structure;

at least one frame unit having an "H" shape and including one pre-formed concrete beam and two pre-formed concrete columns, there being one pre-formed concrete column disposed in abutting relation to said pre-formed concrete beam at each end of said pre-formed concrete beam;

at least one horizontally disposed tubular debonding sleeve having a first end disposed at least partially within a first pre-formed concrete column disposed at a first end of said pre-formed concrete beam and having a second end disposed at least partially within a second pre-formed concrete column disposed at a second end of said pre-formed concrete beam;

at least one horizontally disposed reinforcing member extending through said at least one tubular debonding sleeve in unattached relation thereto;

said at least one horizontally disposed reinforcing member having a first end embedded within said first pre-formed concrete column and having a second end embedded within said second preformed concrete column;

whereby tilting of said first and second pre-formed concrete columns in response to a lateral load impacting thereagainst is resisted by said reinforcing member;

whereby said reinforcing member urges said first and second pre-formed concrete columns to regain a vertical disposition after said lateral load impact has ended if an elastic limit of said reinforcing member has not been exceeded;

whereby said reinforcing member maintains a predetermined amount structural integrity of said modular frame units if said elastic limit has been exceeded; and whereby constructability of said structure is facilitated by said plurality of modular frame units.

13. A lateral load-resistant structure, comprising:

a plurality of modular, pre-assembled frame units that are interconnected to one another at a construction site to collectively form a frame for said lateral load-resistant structure;

at least one frame unit having an "L" shape and including at least one pre-formed concrete beam and at least one pre-formed concrete column disposed in abutting relation to one another;

at least one horizontally disposed tubular debonding sleeve having a first end disposed at least partially within said at least one pre-formed concrete column and having a second end disposed at least partially within said at least one pre-formed concrete beam;

at least one horizontally disposed reinforcing member extending through said at least one tubular debonding sleeve in unattached relation thereto;

said at least one horizontally disposed reinforcing member having opposite ends embedded within said at least one pre-formed concrete column and said at least one preformed concrete beam;

whereby tilting of said at least one pre-formed concrete column in response to a lateral load impacting thereagainst is resisted by said reinforcing member;

whereby said reinforcing member urges said at least one pre-formed concrete column to regain a vertical disposition after said lateral load has ended if an elastic limit of said reinforcing member has not been exceeded;

whereby said reinforcing member maintains a predetermined amount structural integrity of said modular frame unit if said elastic limit has been exceeded;

whereby constructability of said structure is facilitated by said plurality of modular frame units.

14. A lateral load-resistant structure, comprising:

a plurality of modular, pre-assembled frame units that are interconnected to one another at a construction site to collectively form a frame for said lateral load-resistant structure;

each frame unit including at least one pre-formed concrete beam;

each frame unit including at least one pre-formed concrete column;

said at least one concrete beam and said at least one concrete column disposed in abutting relation to one another;

at least one tubular debonding sleeve having a first end embedded within said at least one concrete column and having a second end embedded within said at least one concrete beam;

at least one reinforcing member having a middle section extending through said at least one tubular debonding sleeve in unattached relation thereto;

said at least one reinforcing member having a first end external to said debonding sleeve embedded within said at least one concrete column and having a second end external to said debonding sleeve embedded within said at least one concrete beam so that said middle section is free to stretch in response to a lateral load that causes relative displacement between said at least one concrete column and said at least one concrete beam;

whereby said relative displacement is resisted by said reinforcing member; and whereby constructability of said structure is facilitated by the modular frame units.

15. A lateral load-resistant structure, comprising:

a plurality of modular, pre-assembled frame units that are interconnected to one another at a construction site to collectively form a frame for said lateral load-resistant structure;

each frame unit including at least one pre-formed concrete beam;

each frame unit including at least one pre-formed concrete column;

at least one tubular debonding sleeve disposed horizontally within a pre-formed concrete column;

at least one horizontally disposed reinforcing member extending through said at least one tubular debonding sleeve in unattached relation thereto;

said at least one horizontally disposed reinforcing member having a first end embedded within said at least one pre-formed concrete beam and having a second end embedded within said at least one pre-formed concrete column;

said at least one pre-formed concrete column being a modular column of truncate extent;

a plurality of said pre-formed concrete columns being disposed in vertically stacked relation to one another to form an elongate vertical column;

an elongate duct formed in said modular column;

an elongate tendon slideably disposed in said elongate duct in unattached relation thereto;

anchoring means for engaging opposite ends of said elongate tendon to enable subsequent application of tension thereto;

whereby tilting of said at least one pre-formed concrete column in response to a lateral load impacting thereagainst is resisted by said tendon and said reinforcing member;

whereby said tendon and said reinforcing member collectively urge said at least one pre-formed concrete column to regain a vertical disposition after said lateral load has ended if an elastic limit of said reinforcing member is not exceeded;

whereby said reinforcing member maintains a predetermined amount structural integrity of said frame unit if said elastic limit is exceeded; and whereby constructability of said structure is facilitated by the modular frame units.

* * * * *